United States Patent [19]

Roley et al.

[11] 4,120,537
[45] Oct. 17, 1978

[54] TRACK LINK ASSEMBLY HAVING ROLLER BUSHINGS

[75] Inventors: Robert D. Roley; Glenn M. Haslett, both of Peoria; Dennis L. Blunier, Danvers, all of Ill.

[73] Assignee: Caterpillar Tractor Co., Peoria, Ill.

[21] Appl. No.: 787,814

[22] Filed: Apr. 15, 1977

[51] Int. Cl.² .................................................. B62D 55/20
[52] U.S. Cl. ........................................ 305/14; 305/18; 305/59
[58] Field of Search ................... 305/18, 58 R, 14, 59; 308/240, 237 A

[56] References Cited

U.S. PATENT DOCUMENTS

| 1,319,120 | 10/1919 | Schutz | 305/18 |
| 1,863,858 | 6/1932 | Knox | 305/59 |
| 3,390,923 | 7/1968 | Reinsma | 305/58 X |

FOREIGN PATENT DOCUMENTS

| 267,835 | 7/1950 | Switzerland | 305/18 |
| 731,556 | 6/1955 | United Kingdom | 305/14 |

*Primary Examiner*—Robert B. Reeves
*Assistant Examiner*—John P. Shannon
*Attorney, Agent, or Firm*—Wegner, Stellman, McCord, Wiles & Wood

[57] ABSTRACT

A track link assembly including a plurality of track links having track pin receiving apertures therein, a plurality of track pins extending through associated ones of the apertures and pivotally interconnecting adjacent ones of the links, a plurality of roller bushings rotatably mounted on the ends of the pins, and a plurality of track shoes secured to respective ones of the links.

1 Claim, 2 Drawing Figures

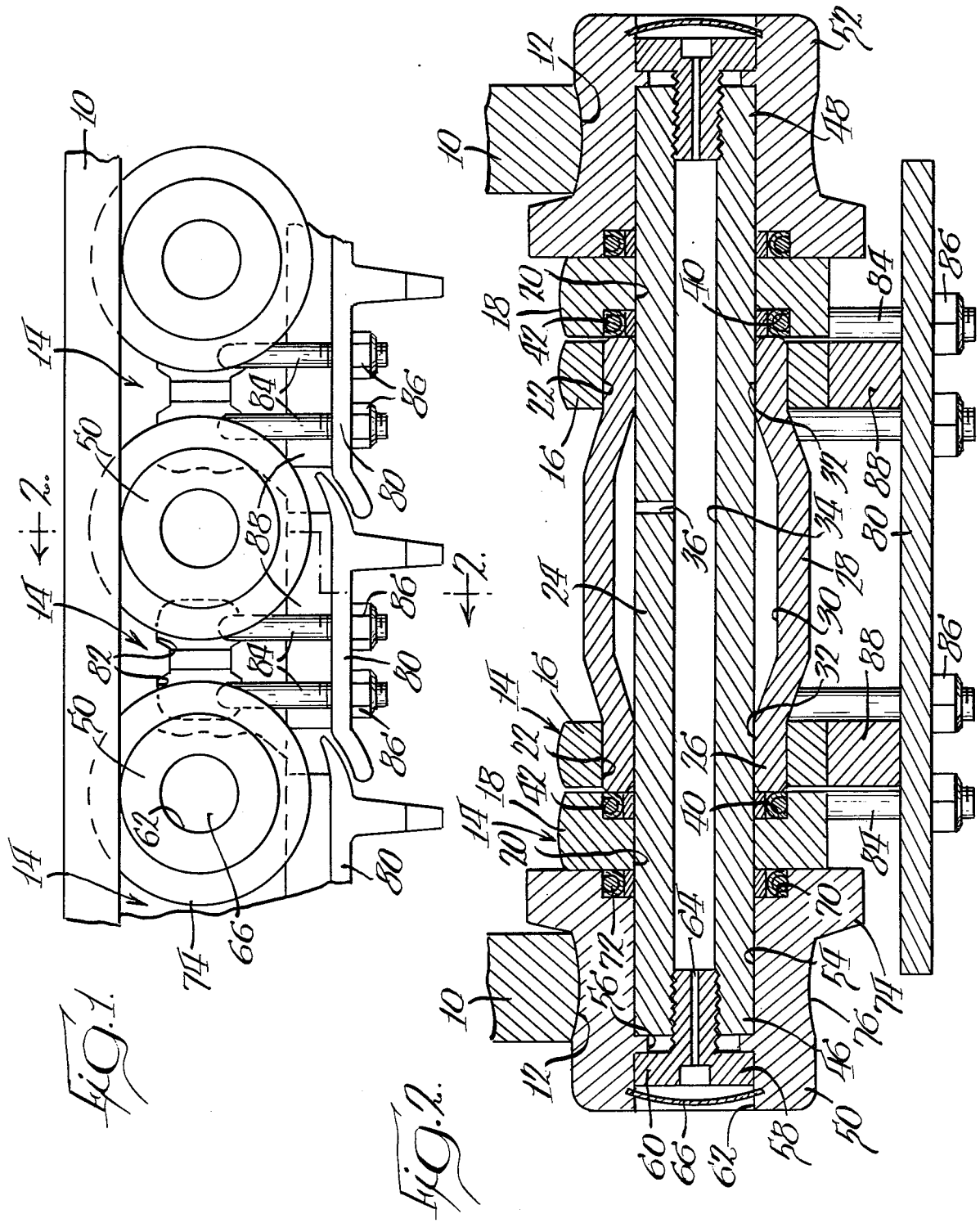

4,120,537

TRACK LINK ASSEMBLY HAVING ROLLER BUSHINGS

BACKGROUND OF THE INVENTION

This invention relates to track link assemblies, and more specifically, to track link assemblies provided with roller bushings.

Over the years, there have been a number of proposals of track link assemblies for use with crawler-type vehicles wherein roller bushings are provided. U.S. Pat. Nos. 1,003,025, issued Sept. 12, 1911 to Baker, and 1,367,820, issued Feb. 8, 1921 to Knaggs are representative of prior art designs.

In many applications, such track link assemblies provided with roller bushings are desirable in that good support for the lower run of the track link assembly, when installed on a crawler-type vehicle is provided. In addition, through the use of rollers, track squirm may be eliminated with the rollers providing better track guidance.

However, as is readily apparent from the disclosures of the above-identified patentees, the mechanisms are relatively complex, including a considerable number of parts. Moreover, access to various components is difficult to achieve and inasmuch as crawler-type vehicles using such track link assemblies typically operate in extremely rough terrains, frequent maintenance is required. The inaccessibility of the components and the complexity thereof, considerably increase the difficulty of performing servicing operations.

Moreover, in other constructions, the assembly may be asymmetrical such that where components performing essentially the same function are duplicated on opposite sides of the assembly, they are made with different tooling thereby increasing the manufacturing cost.

SUMMARY OF THE INVENTION

The present invention is directed to overcoming one or more of the above problems.

According to the present invention, there is provided a track link assembly including a plurality of track links having track pin receiving apertures therein. A plurality of track pins extend through associated ones of the apertures to pivotally interconnect adjacent ones of the links. A plurality of roller bushings are rotatably mounted on the end of the pins and a plurality of track shoes are secured to respective ones of the links.

Other objects and advantages will become apparent from the following specification taken in connection with the accompanying drawings.

DESCRIPTION OF THE DRAWINGS

FIG. 1 is a fragmentary, side elevation of a track link assembly made according to the invention with a fragmentary showing of a part of a track frame used to guide the assembly on a crawler-type vehicle; and FIG. 2 is a vertical section taken approximately along the line 2—2 in FIG. 1.

DESCRIPTION OF THE PREFERRED EMBODIMENT

An exemplary embodiment of a track line assembly made according to the invention is illustrated in the Figures in connection with a track frame including two, elongated, spaced apart, parallel rails 10, each having a convex undersurface 12. The track link assembly includes a plurality of individual track links, generally designated 14, which may be of generally conventional construction. As is well known, each link 14 is formed of spaced apart elements arranged in generally parallel fashion and having offsets therein so that relatively narrow ends 16 of one link are interposed between relatively wide ends 18 of the next adjacent link in serial fashion. The ends 18 include bores 20, while the ends 16 include bores 22 which are aligned with the bores 20. Track pins 24 extend through the bores to pivotally interconnect adjacent ones of the links.

As seen in FIG. 2, according to the present invention, the bores 22 have a larger diameter than the bores 20 and rotatably receive the reduced diameter ends 26 of a central bushing 28. The interior surface 30 of the central portion of the central bushing 28 is spaced from the exterior of the pin 24 while the interior surfaces 32 of the end portions 26 of the central bushing 28 are in abutment with the exterior of the pin 24.

The pin 24 is provided with a through bore 34 and at some location adjacent the center of the pin 24, there is provided an axially extending bore 36 which provides fluid communication between the bore 34 and the expanded interior of the central bushing 28. The expanded interior of the central bushing 28 and the through bore 34 provide a lubricant reservoir for receipt of lubricant such as oil or grease.

As seen in FIG. 2, the axially inner faces of the link ends 18 are provided with annular recesses 40 concentric about the bores 20 for receipt of seals 42 which seal against the ends of the central bushing 28 to prevent lubricant from escaping at the interface between the wide ends 18 and the narrow ends 16 of adjacent links.

It is to be observed that the opposite ends 46 and 48 of each of the pins 24 extend substantially beyond the axially outer faces of the wide ends 18 of the links 14 to rotatably mount roller bushings 50 and 52, respectively. The roller bushings 50 and 52 are identical as are related components and, accordingly, only the roller bushing 50 will be described in detail.

The axially inner end of the roller bushing 50 is provided with an axially extending bore 54 which terminates in a radially inwardly directed, annular shoulder 56. The bore 54 is sized to mount the roller bushing 50 on the end 46 of the pin 24. A bolt 58 having an enlarged head 60 is threaded into mating threads in the end 46 of the pin 24. The enlarged head 60 of the bolt 58 is received in a cavity 62 in the axially outer end of the roller bushing 50 and is abutted against the shoulder 56 sufficiently to retain the roller bushing 50 in place with minimum axial play and yet allow substantially free rotation thereof.

The bolt 58 includes an axially extending bore 64 which establishes fluid communication from the head 60 of the bolt 58 to the interior of the pin 24. Lubricant may be introduced into the reservoir identified previously through the passage 64. In order to preclude loss of lubricant from the reservoir through the passage 64, snap caps 66 are disposed in the cavities 62 on the axially outer side of the bolt heads 60.

The axially inner face of each of the roller bushings 50 is provided with an annular groove concentric with the bore 54 for receipt of a seal 72 which sealingly engages the axially outer face of the adjacent wide end 18. Consequently, it will be appreciated that the entire assemblage is sealed and yet lubricated.

The axially inner end of each of the roller bushings 50 is provided with a peripheral, radially outwardly extending flange 74 which is located axially inwardly of the corresponding rail 10, as best seen in FIG. 2. Immediately adjacent each flange 74 is an annular, peripheral recess 76 which is concave in cross section and formed to substantially mate with the convex surface 12 of the associated rail 10 in line contact therewith.

Each of the links 14 mounts track shoes 80 which may be of conventional construction. Typically, apertures 82 will extend through the narrow ends 16 of the links 14 for receipt of U-bolts 84. The U-bolts 84 extend through aligned bores (not shown) in associated ones of the track shoes 80 to receive nuts 86. Spacers 88 are interposed between the undersides of the narrow ends 16 and the upper sides of the track shoes 80 to space the same sufficiently as to avoid interfering contact with the flanges 74 on the roller bushings 50.

From the foregoing, it will be appreciated that a track link assembly made according to the invention produces numerous advantages over those heretofore known. For one, a single pin 24 is utilized to perform the dual function of pivotally interconnecting adjacent links and to mount the roller bushings. As seen in FIG. 2, the components are symmetrical, allowing the rollers 50 and 52 on opposite ends of the pin 24 to be formed with the same tooling. Maintenance is eased through the minimization of parts and the sealed nature of the various pivotal joints in the assembly seal the same against entry of foreign material. The enlarged interior of the central bushing 28 increases the lubricant capacity of the reservoir so that less frequent replenishment of lubricant is required.

The use of the convex surface 12 on the rails 10 and the concave, in cross section, annular recess 76 in the roller bushings greatly enhances track guidance to prevent squirm thereof and, in addition, provides a good squeezing action on mud or the like to prevent buildup of foreign material. The use of a single bolt 58 in securing each roller bushing 50 or 52 to the assemblage allows easy roller replacement without the disassembly of the entire track chain.

The embodiments of the invention in which an exclusive property or privilege is claimed are defined as follows:

1. In a track link assembly, the combination of:
   a plurality of track links each formed of spaced apart elements and each having opposed ends, one of said ends being relatively wide and the other being relatively narrow, said ends being provided with track pin receiving bores, the narrow ends of said links being interposed between the wide ends of the next adjacent link with said track pin receiving bores in alignment;
   a plurality of central bushings, one for each link, having reduced diameter ends received in the bores of the spaced apart elements forming each link at the relatively narrow end thereof, said central bushing having an expanded central interior;
   annular seals carried by each spaced apart element forming each track link and disposed about the bores at the relatively wide ends thereof and in abutment with the reduced diameter ends of the corresponding central bushing;
   a plurality of pins, each of greater length than the width of said relatively wide ends and extending through corresponding ones of said aligned bores and central bushings to pivotally interconnect adjacent ones of said links, each said track pin including a central bore opening to both ends of the pin and a radial conduit extending from said central cavity into fluid communication with said expanded central interior of said central bushing, the ends of each pin projecting from both sides of the relatively wide ends of each track link, said central bore being threaded at both of its ends;
   a plurality of roller bushings, two for each track pin, each having an axial bore for receiving a corresponding end of one of said track pins, a radially inwardly directed shoulder within said bore intermediate its ends, a radially outwardly directed peripheral flange, and an annular seal receiving groove generally concentric with said axial bore and at one end of said axial bore;
   annular seals within said grooves;
   said roller bushings being disposed on corresponding ends of said track pins such that the annular seals in said annular grooves abut the adjacent sides of the corresponding track links;
   headed, threaded fasteners in said axial bores and threaded into said central bores such that the heads of said fasteners engage corresponding ones of said radially inwardly directed shoulders to retain said roller bushings on said pin ends, at least one threaded fastener for each pin having its head recesses within the axial bore of the associated roller bushing and being provided with an axial conduit in fluid communication with said central bore;
   snap caps removably closing the ends of said axial bores remote from said one end; and
   a plurality of track shoes, one for each track link, secured to a corresponding link.

* * * * *